(12) United States Patent
Mariager

(10) Patent No.: US 11,852,514 B2
(45) Date of Patent: Dec. 26, 2023

(54) MAGNETIC-INDUCTIVE FLOWMETER FOR ROTATIONALLY UNSYMMETRIC FLOWS

(71) Applicant: Endress+Hauser Flowtec AG, Reinach (CH)

(72) Inventor: Simon Mariager, Basel (CH)

(73) Assignee: Endress+Hauser Flowtec AG, Reinach (CH)

( * ) Notice: Subject to any disclaimer, the term of this patent is extended or adjusted under 35 U.S.C. 154(b) by 308 days.

(21) Appl. No.: 17/299,987

(22) PCT Filed: Nov. 11, 2019

(86) PCT No.: PCT/EP2019/080804
§ 371 (c)(1),
(2) Date: Jun. 4, 2021

(87) PCT Pub. No.: WO2020/114720
PCT Pub. Date: Jun. 11, 2020

(65) Prior Publication Data
US 2021/0364331 A1    Nov. 25, 2021

(30) Foreign Application Priority Data

Dec. 6, 2018   (DE) ...................... 10 2018 131 167.2

(51) Int. Cl.
G01F 1/58   (2006.01)
(52) U.S. Cl.
CPC ................... G01F 1/588 (2013.01)

(58) Field of Classification Search
None
See application file for complete search history.

(56) References Cited

U.S. PATENT DOCUMENTS

| | | | |
|---|---|---|---|
| 2021/0164814 A1* | 6/2021 | Mariager | G01F 25/10 |
| 2022/0057241 A1* | 2/2022 | Mariager | G01F 1/588 |

FOREIGN PATENT DOCUMENTS

| | | |
|---|---|---|
| CN | 101900583 A | 12/2010 |
| CN | 103797338 A | 5/2014 |
| DE | 102008059067 A1 | 6/2010 |
| DE | 102011079351 A1 | 1/2013 |
| DE | 102011079352 A1 | 1/2013 |
| DE | 102014113408 A1 | 3/2016 |
| DE | 102018108197 A1 | 10/2019 |

(Continued)

*Primary Examiner* — Harshad R Patel
(74) *Attorney, Agent, or Firm* — Christopher R. Powers; Endress+Hauser (USA) Holding, Inc.

(57) ABSTRACT

A magnetic-inductive flowmeter includes: a measuring tube; a magnetic field generator including a pole shoe for producing in the medium a magnetic field extending perpendicular to the longitudinal direction, wherein the pole shoe subtends a field central angle; and at least two measuring electrode components in galvanic contact with the medium, wherein the measuring electrode components have a circular arc length, which subtends an electrode central angle, wherein the field and electrode central angles are so adapted relative to one another that the flowmeter is insensitive to departures from a rotationally symmetric flow to a degree such that the magnetic-inductive flowmeter has in a test measurement a measurement error of flow velocity and/or a measurement error of volume flow of less than 0.2%.

15 Claims, 6 Drawing Sheets

(56) References Cited

FOREIGN PATENT DOCUMENTS

| EP | 0183859 A1 | 6/1986 |
| EP | 0418033 A1 | 3/1991 |
| GB | 1275137 A | 5/1972 |
| GB | 1275137 A1 | 5/1972 |
| JP | 08247812 A | 9/1996 |
| WO | 2004031699 A2 | 4/2004 |

* cited by examiner

MAGNETIC-INDUCTIVE FLOWMETER FOR ROTATIONALLY UNSYMMETRIC FLOWS

CROSS-REFERENCE TO RELATED APPLICATIONS

The present application is related to and claims the priority benefit of German Patent Application No. 10 2018 131 167.2, filed on Dec. 6, 2018, and International Patent Application No. PCT/EP2019/080804, filed on Nov. 11, 2019, the entire contents of which are incorporated herein by reference.

TECHNICAL FIELD

The present disclosure relates to magnetic-inductive flowmeters, particularly magnetic-inductive flowmeters for rotationally unsymmetric flows.

BACKGROUND

Magnetic-inductive flowmeters are applied for determining flow velocity and/or volume flow of a medium in a measuring tube. A magnetic-inductive flowmeter includes a magnetic field producing means, which produces a magnetic field extending perpendicularly to the transverse axis of the measuring tube. For such purpose, usually one or more coils are used. In order to implement a predominantly uniform magnetic field, supplementally, saddle coils or pole shoes are so formed and placed such that the magnetic field lines extend over the total tube cross-section essentially perpendicularly to the transverse axis. A measuring electrode pair situated at the wall of the measuring tube senses an inductively produced electrical measurement voltage, which arises, when a conductive medium flows in the direction of the longitudinal axis in the presence of a magnetic field. Since the registered measurement voltage depends according to Faraday's law of induction on the velocity of the flowing medium, flow velocity and, with incorporation of a known tube cross-sectional area, volume flow of the medium can be ascertained from the measurement voltage.

Magnetic-inductive flowmeters are sensitive to the flow profile of the flowing medium. Depending on pipe system and measurement device, measurement errors of a number of percent can occur. Usually, consequently, a straight pipe, whose length is at least 5 to 10 times the nominal diameter of the measuring tube, is installed at the inlet end. There are, however, applications known, in which this minimum distance, the so-called inlet path, cannot be used. This is, for example, the case, when a pipe system is located in tight quarters. A solution is proposed in DE102014113408A1, where a narrowing of the tube diameter provides conditioning of the flow, whereby the influence of the flow profile is minimized, so that a 0-DN inlet path can be used. This embodiment is disadvantageous, however, in that, while a lower sensitivity to rotationally unsymmetric flow profiles can be realized, a pressure loss must be tolerated. Moreover, these embodiments are limited to pipe systems with DN<600.

The influence of the geometry on the flow can best be illustrated by the following relationship:

$$U(x) = \int_V v(x')GF(x', x)dV$$

wherein, for determining the voltage U(x), flow velocity v(x') and the weighting function GF(x', x) are integrated over the volume of the measuring tube. In such case, the weighting function GF enters based on GF(x', x)=B×∇G(X', X), with the magnetic field B(x') and a Green's function G, which is provided by the electrical boundary conditions. The goal of an optimizing method is to optimize the geometry of the construction such that ∇×GF=0 in the total flow profile. Such is, however, not possible for a tube with a single point shaped electrode pair. An adapting of the electrode form provides a possible approach to a solution.

Known from DE102008059067A1 is a magnetic-inductive flowmeter with strip-like measuring electrodes forming a galvanic contacting of the medium. In such case, the measuring electrodes are especially of the same material or a similar material as the internal coating of the measuring tube, wherein the material of the measuring electrodes has a significantly higher electrical conductivity than the material of the internal coating. This embodiment is disadvantageous, however, in that, while it has functional, structural and production advantages, it offers no solution to the problem of flow profile dependent measurement error.

Known, for example, from DE102018108197A1 is a magnetic-inductive flowmeter, which minimizes the influence of a rotationally unsymmetric flow profile in the case of determining flow velocity and volume flow by providing at least one supplemental measuring electrode pair in the interior of the measuring tube. This embodiment is disadvantageous, however, in that, while the influences of the rotationally unsymmetric flow profile are minimized, additional measuring electrodes and additional holes in the measuring tube must be provided, and, thus, extra potential leakage locations arise.

SUMMARY

Starting from the above described state of the art, an object of the present invention is to provide a magnetic-inductive flowmeter, which minimizes the influences of a rotationally unsymmetric flow profile in the determining of flow velocity and volume flow.

The object is achieved by the magnetic-inductive flowmeter according to the present disclosure.

A magnetic-inductive flowmeter of the invention for measuring flow velocity u or volume flow $\dot{V}$ of a medium comprises a measuring tube for conveying the medium in a longitudinal direction defined by a measuring tube axis, wherein the measuring tube has an inlet side end plane and an outlet side end plane, which bound the measuring tube in the longitudinal direction, at least one magnetic field producing means for producing in the medium a magnetic field extending essentially perpendicularly to the longitudinal direction, wherein a vertical longitudinal plane divides the measuring tube into a first side and a second side, wherein the magnetic field producing means has a pole shoe, wherein the pole shoe in a cross-section of the measuring tube subtends a maximum central angle β, and at least two measuring electrode components forming a galvanic contact with the medium and adapted to sense a voltage between the measuring electrode components induced perpendicularly to the magnetic field and to the longitudinal direction, wherein the measuring electrode components are embodied strip- and circular arc shaped and have, in each case, a circular arc length 1, which subtends a central angle α in the cross-section of the measuring tube, wherein a first measuring electrode component is arranged on the first side and a second measuring electrode component on the second side on an inner surface of the measuring tube, characterized in that the central angles $\alpha$ and $\beta$ are so adapted relative to one another that the flowmeter is insensitive to departures from a rotationally symmetric flow to a degree such that the magnetic-inductive flowmeter has in a test measurement a measurement error of flow velocity $\Delta_u = |(u_{va} - u_S)/u_{va}|$ and/or a measurement error of volume flow $\Delta_{\dot{V}} = |(\dot{V}_{va} - \dot{V}_S)/\dot{V}_{va}|$ of less than 1.0%, especially less than 0.5% and preferably less than 0.2%, wherein flow velocity $u_{va}$ and/or volume flow $\dot{V}_{va}$ are determined in the case of a flow with fully developed flow profile, wherein flow velocity $u_S$ and/or volume flow $\dot{V}_S$ are determined in the case of a rotationally unsymmetric flow.

A magnetic-inductive flowmeter, which is insensitive to a rotationally unsymmetric flow profile, is ideal for monitoring pipe systems, in the case of which an optimal inlet path, whose length is a multiple of the nominal diameter of the measuring tube, cannot be implemented.

Disturbances bring about, depending on distance and type of disturbance, measurement errors due to a non-ideal flow profile of the medium, since a magnetic-inductive flowmeter, normally, is optimized such that a fully developed, rotation symmetric flow profile is present. A fully developed, rotation symmetric flow profile is one, in which the flow profile no longer changes in the flow direction. Such a flow profile forms, for example, in a measuring tube having an inlet path length 30 times measuring tube nominal diameter and a medium velocity of 2 m/s.

The central angle $\beta$ serves, in such case, as characteristic variable for the magnetic field producing means and gives the extent of the measuring tube cross-sectionally surrounded by the pole shoe. While a small central angle $\beta$ provides that the magnetic field lines are concentrated exclusively in the center of the measuring tube, the use of a large central angle $\beta$ spreads the magnetic field uniformly approximately over the entire cross-section of the measuring tube. The central angle $\beta$ is, in such case, characterized by two lines, which meet in the center of the tube and each of which intersects its one of the two ends of the pole shoe.

There are magnetic field producing means known, which include a field-guide material for the outer field and have at least one shielding element between a pole shoe and the field-guide material and/or above the field-guide material and the electromagnets. These components serve for reducing disturbance- or stray fields and are not responsible for the in-coupling of the magnetic field into the medium.

The magnetic field producing means is arranged outside of the measuring tube and is secured completely against, partially against or with a fixed distance from, the measuring tube.

The measuring tube is embodied to be electrically insulating on its inside contacting the medium, and, indeed, on the one hand, e.g. in such a manner that the measuring tube is composed completely of an insulating material, especially sintered ceramic, preferably aluminum oxide ceramic, or a plastic. On the other hand, the insulation can also be implemented in that a non-ferromagnetic metal tube, especially a stainless steel tube, is lined internally with an insulating layer of a suitable plastic, especially hard rubber, soft rubber or a polyfluoroethylene, preferably polytetrafluoroethylene.

The central angle $\alpha$ serves as characteristic variable for the measuring electrode components sensing a measurement voltage in the medium. A strip- and circular arc shaped measuring electrode component has a width w and a circular arc length l, wherein the circular arc length l subtends the central angle $\alpha$ in the cross-section of the measuring tube. The central angle $\alpha$ is, in such case, characterized by two lines, which meet in the center of the tube and each of which intersects its one of the two ends of the measuring electrode component.

For ascertaining flow velocity and/or volume flow of a flow with fully developed flow profile, a flowmeter is used, which is based on the Coriolis principle and has an accuracy of measurement of 0.1%. Such is installed in a pipe system having a 0 m (or 0 DN) inlet path and serves as reference system for the magnetic-inductive flowmeter of the invention.

In an embodiment, the following holds for the central angle $\alpha$: $30° \leq \alpha \leq 60°$ and, for example, $40° \leq \alpha \leq 50°$.

In an embodiment, the following holds for the central angle $\beta$: $50° \leq \beta \leq 90°$ and, for example, $70° \leq \beta \leq 80°$.

The setting of the central angles $\alpha$ and $\beta$ is performed with a simulation program or based on a test environment. A test environment is defined or established and the central angles of the flowmeter adjusted until the measurement error for the test environment is minimum.

In an embodiment, a rotationally unsymmetric flow is produced for the test measurement by a disturbance installed at the inlet side end plane and comprising at least one disturbance source.

The test measurement can also serve for coordinating the optimal central angles $\alpha$ and $\beta$ and is then performed earlier, so that taking into consideration the optimized central angle pair $\alpha$ and $\beta$ a flow profile independent, magnetic-inductive flowmeter can be implemented.

The test measurement can include many different disturbance sources, which all can assume any installed angles. Because of the application of sufficiently different disturbances the central angles $\alpha$ and $\beta$ can be optimized such that the measurement error of a particular disturbance assumes a value of less than 0.05% and the maximum measurement error of any disturbance is less than 0.5%.

It has been found that by the use of two sufficiently different disturbance sources, especially a diaphragm and a 90° elbow, an effectively good central angle pair $(\alpha, \beta)$ can be ascertained for a magnetic-inductive flowmeter, so that some other disturbance leads to a maximum measurement error of 0.5%. By taking into consideration further disturbance sources in the test measurement, the optimized parameters change only marginally, whereby the resulting measurement error changes only slightly.

In an embodiment, 10% of the cross-section of the measuring tube is covered by the diaphragm, wherein the diaphragm has a chord, which bounds the diaphragm toward the tube, wherein the diaphragm assumes a first diaphragm orientation or a second diaphragm orientation, wherein in the case of the first diaphragm orientation the chord is oriented perpendicularly to the magnetic field and in the case of the second diaphragm orientation the chord is oriented in parallel with the magnetic field, wherein the 90° elbow assumes a first elbow orientation or a second elbow orientation, wherein the first elbow orientation is distinguished by a tube axis extending perpendicularly to the magnetic field and to the longitudinal direction of the measuring tube and the second elbow orientation is distinguished by a tube axis extending in parallel with the magnetic field and perpendicularly to the longitudinal direction of the measuring tube.

Previously, a user of magnetic-inductive, flowmeters has been told to provide a prescribed inlet path. This prescribed inlet path has been necessary, in order to operate within the measurement error predetermined for the device. The arising measurement error must be ascertained once per disturbance type, distance, mounting angle and possibly Reynolds number. This is performed either with a complex test series or by simulation of the flow conditions for different disturbances and evaluation of the calculated flow profiles. As a result of this step, one obtains data, which give how large the measurement error would be, when a magnetic-inductive flowmeter would be installed in the corresponding position and how large the measurement error would be, when the central angle α of the measuring electrode components or the central angle β of the magnetic field producing means is adjusted.

In an embodiment, the disturbance is furnished with distance 0-DN from the inlet side end plane.

In an embodiment, an insensitivity to a rotationally unsymmetric flow profile is provided at a Reynolds number of the medium in the measuring tube greater than or equal to 100,000, especially greater than or equal to 50,000 and preferably greater than or equal to 10,000.

In an embodiment, the measuring electrode component has a square, rectangular or oval media contacting surface.

In an embodiment, the surface is rounded at its ends or transitions into a circularly shaped cross-section.

In this way, discontinuities in the weighting function at the electrode ends can be prevented and a smoother weighting function results, which can better be optimized. Edge effects can, thus, be prevented.

In an embodiment, the measuring electrode component includes at least one electrode shaft and an electrode sheet material, wherein the electrode shaft is adapted to contact the electrode sheet material electrically and to connect with the inner surface of the measuring tube by shape interlocking.

It is especially advantageous that the measuring electrode component includes an electrode sheet material, since this can be produced cost effectively and can be integrated simply in the method of producing the magnetic-inductive flowmeter. Furthermore, an electrode sheet material can be embodied circular arc shaped, so that it can match the inner surface of the measuring tube.

When the electrode shaft and the electrode sheet material are embodied as two pieces, advantageously the electrode shaft is adapted and formed in such a manner that it electrically contacts the electrode sheet material and connects with the inner surface of the measuring tube by shape interlocking. Ideally, the electrode shaft has a mushroom shaped electrode head, which is adapted during the securement of the electrode shaft to press the electrode sheet material against the inner surface of the measuring tube and, thus, to produce a shape interlocking connection.

In an embodiment, the electrode shaft is stylus shaped, pointed or mushroom shaped.

In an embodiment, the at least one electrode shaft and the electrode sheet material are embodied as one piece or connected by material bonding.

Advantageously, the electrode shaft and the electrode sheet material are embodied as one piece. In this way, the assembly is significantly simplified. It is especially advantageous that the electrode shaft be connected with the electrode sheet material by material bonding with the aid of a weld-, adhesive- or screw method. This simplifies the manufacture of the electrode component significantly.

In an embodiment, the measuring electrode components are arranged axisymmetrically to the vertical longitudinal plane.

The two measuring electrode components do not necessarily have to be arranged diametrically opposite one another and are at least partially galvanically or capacitively coupled with the measured medium.

BRIEF DESCRIPTION OF THE DRAWINGS

The invention will now be explained in greater detail based on the appended drawing, the figures of which show as follows.

DETAILED DESCRIPTION.

Figure 1:
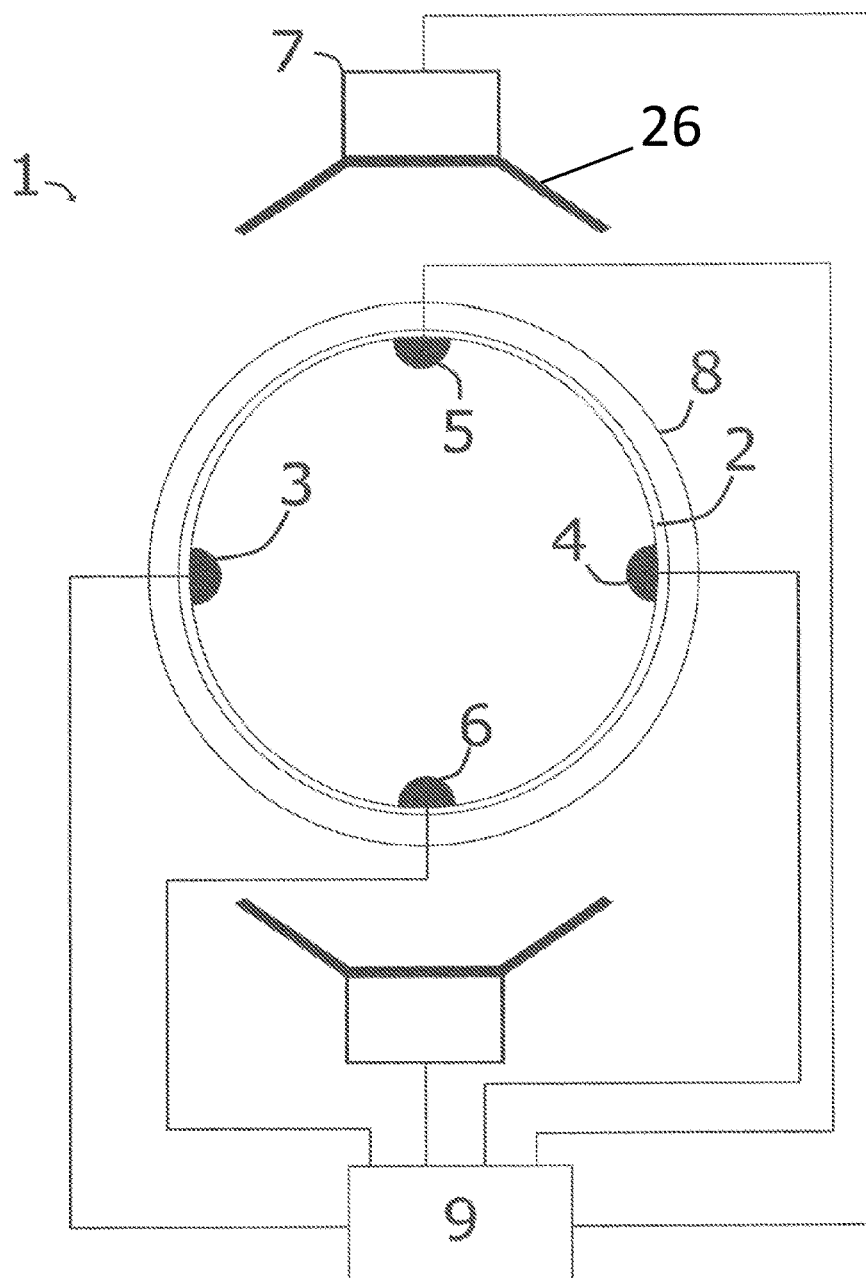
FIG. 1 shows a schematic view of the cross section of a magnetically inductive flowmeter of the state of the art.

FIG. 1 shows a magnetic-inductive flowmeter known in the state of the art. The construction and the measuring principle of a magnetic-inductive flowmeter are basically known. An electrically conductive medium is led through the measuring tube (1). A magnetic field producing means (7) is arranged such that the magnetic field lines extend perpendicularly to a longitudinal direction defined by the measuring tube axis (13). Suited as magnetic field producing means (7) is preferably a saddle coil or a pole shoe (26) with superimposed coil and coil core. In the case of applied magnetic field, there arises in the measuring tube (1) a flow dependent potential distribution, which is sensed with two measuring electrodes (3, 4) applied at the inner surface of the measuring tube (1). As a rule, these are arranged diametrically opposite one another and form an electrode axis, which extends perpendicularly to the magnetic field lines and to the longitudinal axis of the tube. Based on the measured measurement voltage and taking into consideration the magnetic flux density, flow velocity can be determined and further taking into consideration the tube cross-sectional area, volume flow of the medium can be determined. In order to avoid the diverting of the measurement voltage on the measuring electrodes (3, 4) through the tube (8), the inner surface is lined with an insulating material, for example, in the form of a plastic liner (2). The magnetic field formed by a magnetic field producing means, for example, an electromagnet, is produced by a direct current of alternating polarity clocked by means of an operating unit. This assures a stable zero-point and makes the measuring insensitive to influences of multiphase materials, inhomogeneities in the medium or low conductivity. A measuring unit reads out the voltage on the measuring electrodes (3, 4) and outputs flow velocity and/or volume flow of the medium calculated by means of an evaluation unit. Usual magnetic-inductive flowmeters have supplementally to the measuring electrodes (3, 4) two other electrodes (5, 6). On the one hand, a fill level monitoring electrode (5) mounted optimally at the highest point in the tube (8) serves to detect a partial filling of the measuring tube (1), to forward this information to the user and/or the fill level is taken into consideration for the ascertaining of volume flow. Furthermore, a reference electrode (6), which is usually mounted diametrically opposite the fill level monitoring electrode (5), serves to assure an effective grounding of the medium.

Figure 2:
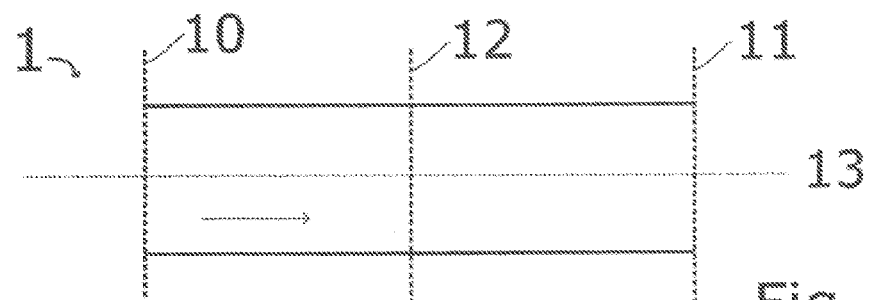
FIG. 2 shows a schematic view of the longitudinal section of a magnetically inductive flowmeter of the state of the art.

A magnetic-inductive flowmeter includes an inlet side end plane (10) and an outlet side end plane (11). The arrow in FIG. 2 indicates the flow direction of the medium. A 90° elbow (90° R) or a diaphragm (B) applied at the inlet side end plane (10) acts on the flow profile of the medium, such that a rotationally unsymmetric flow profile forms in the cross-section (12) of the measuring tube (1).

Figure 3:
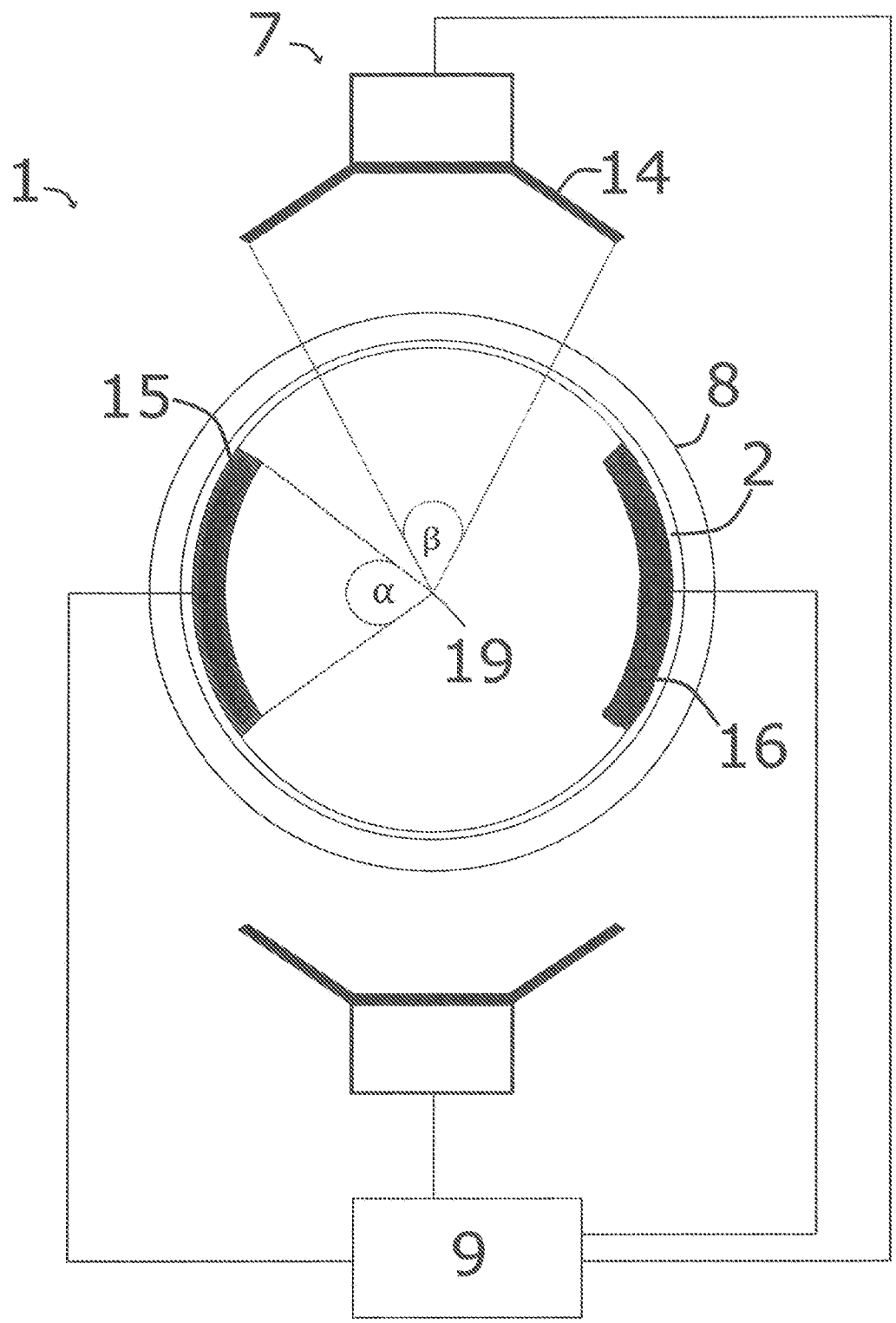
FIG. 3 shows a schematic view of the cross section of a magnetically inductive flowmeter of the present disclosure.

FIG. 3 shows a magnetic-inductive flowmeter of the invention. The construction and the measuring principle of a magnetic-inductive flowmeter are basically known. An electrically conductive medium is led through the measuring tube (1). A magnetic field producing means (7) is placed such that the magnetic field lines extend perpendicularly to a longitudinal direction defined by the measuring tube axis (13). Suited as magnetic field producing means (7) is preferably a saddle coil or a pole shoe (14) with superimposed coil and coil core. In the presence of an applied magnetic field, there arises in the measuring tube (1) a flow dependent potential distribution, which is sensed with two measuring electrodes, in this case in the form of two measuring electrode components (15, 16), applied at the inner surface of the measuring tube (1). As a rule, the two measuring electrodes are arranged diametrically opposite one another and form an electrode axis, which extends perpendicularly to the magnetic field lines and to the longitudinal axis of the tube. Based on the measured measurement voltage and taking into consideration the magnetic flux density, flow velocity of the medium can be determined, and additionally taking into consideration the tube cross-sectional area, volume flow of the medium can be determined. In order to avoid the diverting of the measurement voltage on the measuring electrode components (15, 16) through the tube (8), the inner surface is lined with an insulating material, for example, in the form of a plastic liner (2). The magnetic field formed by a magnetic field producing means (7), in this case, a pole shoe (26) with superimposed coil, is produced by a direct current of alternating polarity clocked by means of an operating unit. This assures a stable zero-point and makes the measuring insensitive to influences of multiphase materials, inhomogeneities in the medium or low conductivity. The magnetic field producing means (7) is characterized by the central angle β. The central angle β describes to what extent the measuring tube is occupied by the magnetic field producing means. In the embodiment shown in FIG. 3, the pole shoe has three segments, wherein the first and the third segment, especially the two outer segments, are, in each case, intersected by a straight section extending from the center of the tube. The ends of the two straight outer segments subtend a circular sector with central angle β. A measuring unit reads the voltage on the measuring electrode components (15, 16) and outputs flow velocity and/or volume flow of the medium calculated by means of an evaluation unit. The two measuring electrode components (15, 16) are each characterized by the central angle α. The ends of the measuring electrode components (15, 16) are intersected each by two lines to the center of the tube, wherein each two lines subtend a circular sector with central angle α.

The magnetic field producing means (7) is conventionally so designed that the magnetic field lines are distributed as uniformly as possible over the cross-section (12) of the measuring tube. Especially, the magnetic field producing means (7) is so adapted that a linear relationship exists between the ascertained measurement voltage and the flow of the medium. In this way, especially for fully developed flow profiles, measurement errors of less than 0.2% can be achieved. In the case of a rotationally unsymmetric flow profile, a uniform magnetic field can affect the accuracy of measurement disadvantageously. This problem can be solved according to the invention by adapting the magnetic field producing means (7), especially by adjusting the central angle β.

Because of the variation of the central angle β, which describes the extent to which a segment of the magnetic field producing means (7) applied on the measuring tube (1) surrounds the measuring tube (1), one obtains an additional degree of freedom for reducing the measurement error. A segment coupling the magnetic field into the medium can comprise a pole shoe (14), which has two legs bordering on a planar area and even two circular arcs bordering its planar area. Alternatively, a pole shoe (14) can also completely have the form of a circular arc. Generally, a segment coupling the magnetic field into the medium can assume any contour composed of at least one additional subsegment. For ascertaining the maximum central angle β, those segments are taken into consideration, which are essentially responsible for coupling the magnetic field into the medium.

Figure 4:
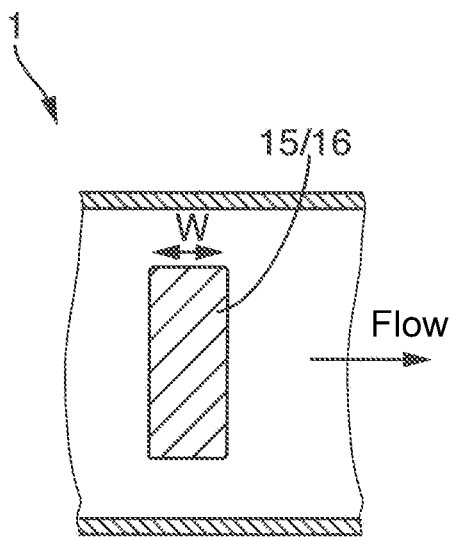
FIG. 4 shows a schematic view of the longitudinal section of a magnetically inductive flowmeter of the present disclosure.

FIG. 4 shows a longitudinal section of the measuring tube (1) with a measuring electrode component (15, 16) of the invention. The measuring electrode component (15, 16) is, in such case, embodied with strip shape and has a width w. Furthermore, the ends of the measuring electrode component (15, 16) are rounded.

Figure 5:
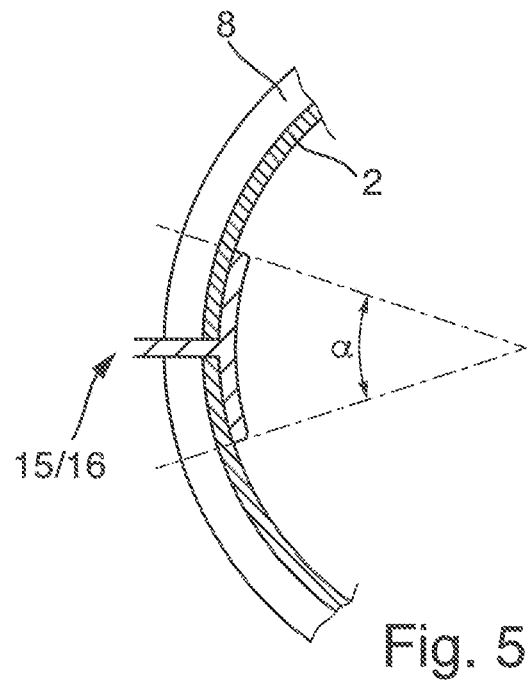
FIG. 5 shows a schematic view of a first embodiment of the electrode assembly.

FIG. 5 shows a first embodiment of the measuring electrode component (15, 16). In such case, the electrode sheet material (17) and the electrode shaft (18) are embodied as one piece.

Figure 6:
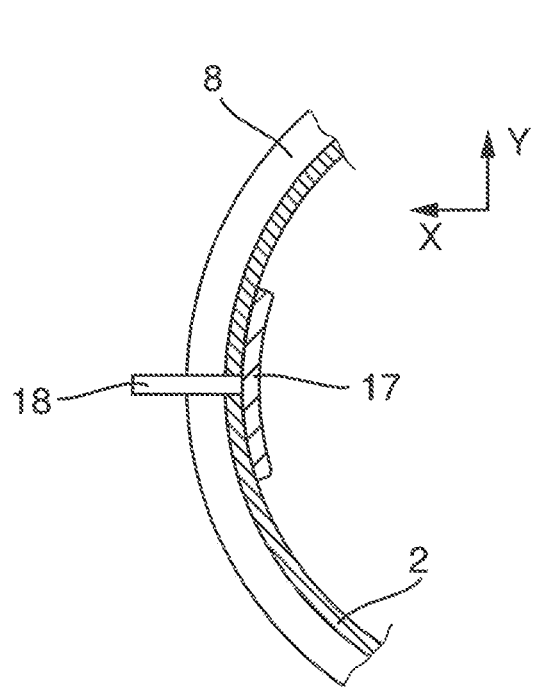
FIG. 6 shows a schematic view of a second embodiment of the electrode assembly.

In contrast, the second embodiment in FIG. 6 shows a two-piece measuring electrode component (15, 16), which is composed of an electrode sheet material (17) and a circularly cylindrical electrode shaft (18) passing through at least the liner (2) and the tube (8). In such case, the electrode shaft (18) has the shape of a bolt and is connected with the electrode sheet material (17) by material bonding, especially welded, adhered, screwed, brazed or soldered.

Figure 7:
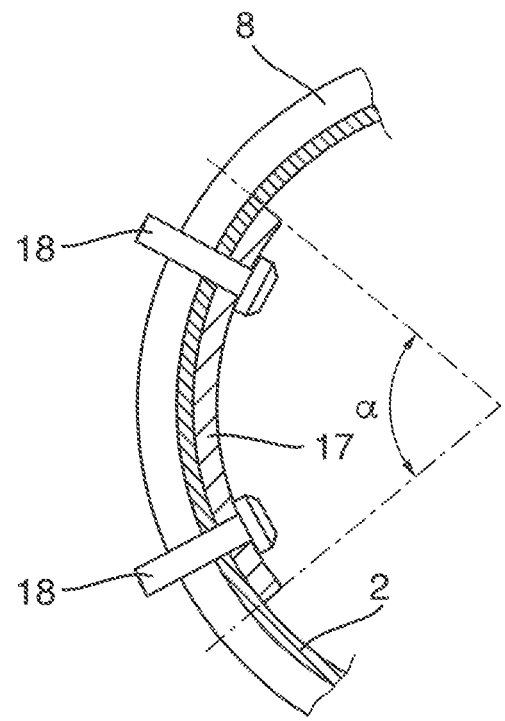
FIG. 7 shows a schematic view of a third embodiment of the electrode assembly.

In the third embodiment shown in FIG. 7, the measuring electrode component (15, 16) is so embodied that the electrode sheet material (17), the liner (2) and the tube (8) have each a passageway and the electrode shaft (18) extends through the passageways of the electrode sheet material (17), the liner (2) and the tube (8). In such case, as FIG. 7 shows, the electrode shaft is provided with a lens shaped electrode head lying in the interior of the measuring tube (1) against the electrode sheet material (17). In other words, the electrode shaft is embodied as a mushroom electrode. Furthermore, the measuring electrode component (15, 16) according to the third embodiment includes two electrode shafts (18), whereby the electrode sheet material (17) is pressed at two points against the inner surface of the measuring tube (1), in order to implement the securement of the electrode sheet material (17).

Figure 8:
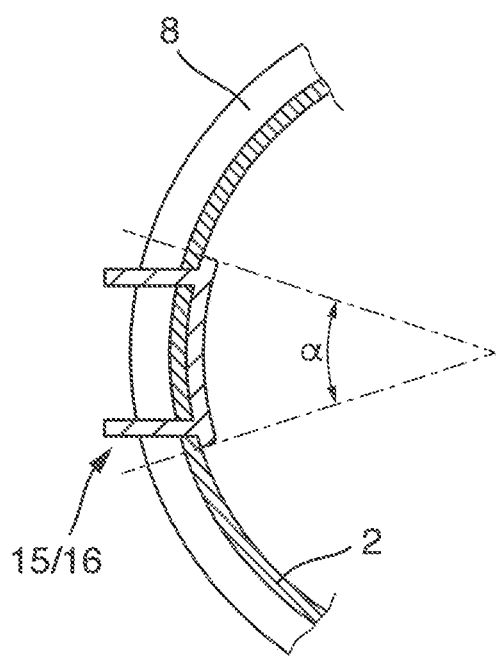
FIG. 8 shows a schematic view of a fourth embodiment of the electrode assembly.

Similarly as in the case of the third embodiment, the electrode sheet material (17) of the fourth embodiment is pressed against the inner surface of the measuring tube (1) with the aid of at least two electrode shafts (18) (see FIG. 8). In such case, the electrode shafts (18) are embodied as one piece with the electrode sheet material (17), or at least connected with the electrode sheet material (17) by material bonding.

In the simulations, a magnetic-inductive flowmeter with two diametrically arranged measuring electrode components (15, 16) forms the basis for calculating the optimal central angles α and β. The measuring electrode components (15, 16) are strip shaped. The optimizing of the central angles α and β proceeds in steps as follows:

In the first step, the central angles α and β are so adapted that the measurement error of flow velocity in test measurements with a single disturbance is minimum. In such case, the disturbance is generated by a diaphragm or a 90° elbow (90° R) (see FIG. 9).

Figure 9:
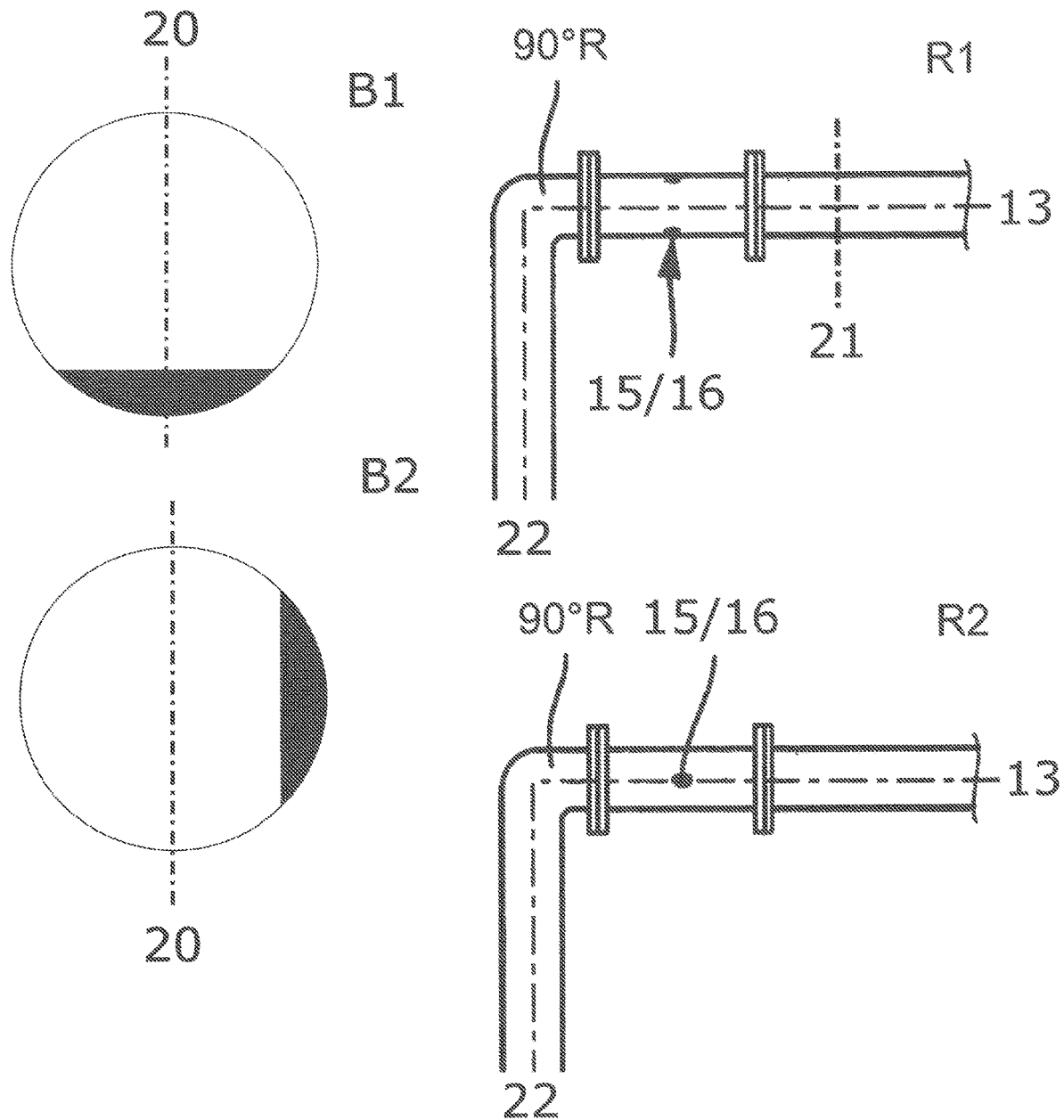
FIG. 9 shows schematic views of different disturbance sources.

The diaphragm covers, in such case, 10% of the tube cross-section (12) and has a chord, which bounds the diaphragm toward the tube. The diaphragm assumes a first diaphragm orientation (B1) or a second diaphragm orientation (B2), which especially are rotated by 90° relative to one another. In such case, the chord in the case of the first diaphragm orientation (B1) is perpendicular to the magnetic field and in the case of the second diaphragm orientation (B2) in parallel with the magnetic field. The first diaphragm orientation (B1) and the second diaphragm orientation (B2) of a diaphragm are shown schematically in FIG. 9. The black filled circular segment represents, in such case, the area, which blocks a part of the cross-sectional area of the measuring tube. In the test measurement, the diaphragm (B) is placed at a distance of 0-DN from the inlet side end plane (10). Alternatively, a 90° elbow (90° R) is placed at the entrance to the inlet side end plane (10) at a distance of 0-DN, wherein the 90° elbow (90° R) assumes a first elbow orientation (R1) or a second elbow orientation (R2), which especially are rotated by 90° relative to one another. The first elbow orientation (R1) and the second elbow orientation (R2) of a 90° elbow (90° R) are schematically shown in FIG. 9. The selecting of the central angles α and β is preferably performed for both disturbances in both orientations.

In the second step, that central angle pair is determined, whose maximum measurement error for all performed test measurements is minimum.

Figure 10:
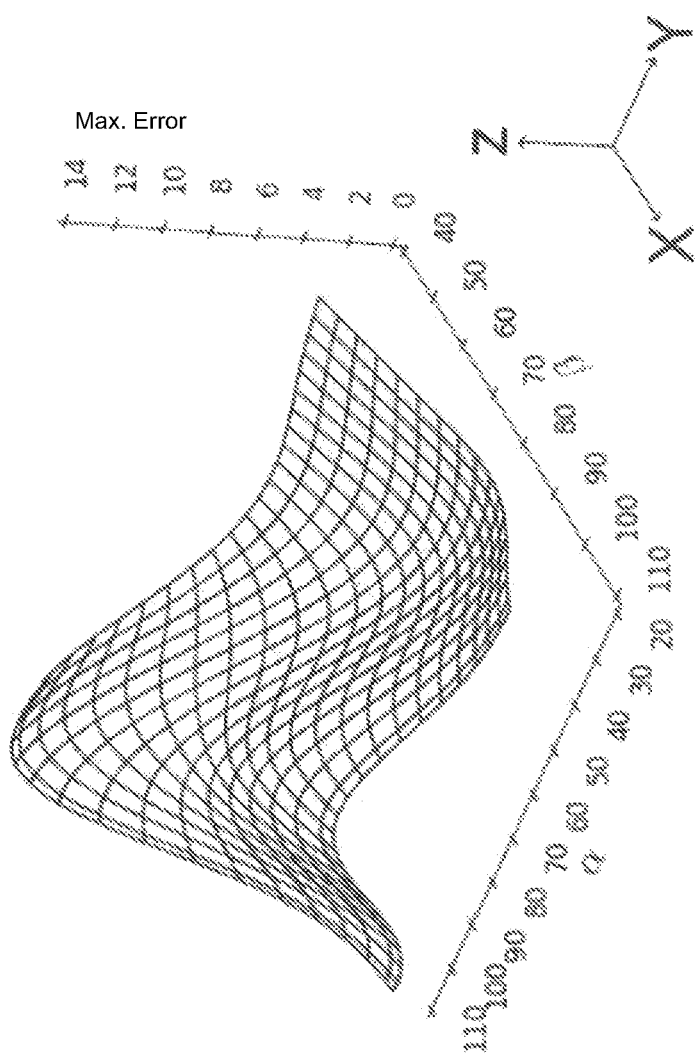
FIG. 10 shows a graph of measurement error as a function of central angles α and β for a 50-DN measuring tube.

FIG. 10 shows, by way of example, simulated measurement error (Z axis) for a 50-DN measuring tube (1) as a function of the central angle α (Y axis) and the central angle β (X axis). Based on this, the minimum measurement error for a specific disturbance, in this case, an elbow (90° R) optimized as regards first and second elbow orientations (R1, R2), is ascertained. In such case, the first elbow orientation (R1) is distinguished by a measuring tube axis (13) extending perpendicularly to the magnetic field and to the longitudinal direction and the second elbow orientation (R2) by a measuring tube axis (13) extending in parallel with the magnetic field and perpendicularly to the longitudinal direction (see FIG. 9). This procedure is repeated for all above mentioned disturbances, wherein, in the last step, that central angle pair is ascertained, which has the smallest measurement error with reference to all test measurements. The values for the central angles α and β are adapted until the resulting measurement error for all test measurements is less than 0.5%, preferably less than 0.2%.

Based on the above described optimizing method, a magnetic-inductive flowmeter of the invention with a 50-DN measuring tube (1) and a medium with a flow velocity of 1 m/s has a measurement error of 0.1% in the case of an installed diaphragm with diaphragm orientation (B1), and a measurement error of 0.1% in the case of an installed diaphragm with diaphragm orientation (B2).

The invention claimed is:

1. A magnetic-inductive flowmeter for measuring flow velocity or volume flow of a medium, the flowmeter comprising:
    a measuring tube configured to convey the medium in a longitudinal direction defined by a measuring tube axis, the measuring tube including an inlet side end plane and an outlet side end plane, which bound the measuring tube in the longitudinal direction;
    a magnetic field generator configured to generate a magnetic field in the medium extending essentially perpendicular to the longitudinal direction, the magnetic field generator including a pole shoe that subtends a field central angle in a cross-section of the measuring tube, wherein a vertical longitudinal plane divides the measuring tube into a first side and a second side; and
    at least two measuring electrode components forming a galvanic contact with the medium and adapted to sense a voltage between the at least two measuring electrode components induced perpendicular to the magnetic field and to the longitudinal direction,
    wherein the at least two measuring electrode components are strip and circular arc shaped and have, in each case, a circular arc length that subtends an electrode central angle in the cross- section of the measuring tube,
    wherein a first measuring electrode component of the at least two measuring electrode components is arranged on the first side and a second measuring electrode component of the at least two measuring electrode components on the second side on an inner surface of the measuring tube, wherein:
        the field central angle and the electrode central angle are adapted relative to each other such that the flowmeter is insensitive to departures from a rotationally symmetric flow to a degree such that the magnetic-inductive flowmeter has in a test measurement a measurement error of flow velocity and/or a measurement error of volume flow of less than 1.0%;
        the flow velocity and/or the volume flow are determined in the case of a flow with fully developed flow profile; and
        the flow velocity and/or volume flow are determined in the case of a rotationally unsymmetric flow.

2. The flowmeter of claim 1, wherein the field central angle and the electrode central angle are adapted relative to each other that the flowmeter is insensitive to departures from a rotationally symmetric flow to a degree such that the magnetic-inductive flowmeter has in a test measurement a measurement error of flow velocity and/or a measurement error of volume flow of less than 0.2%.

3. The flowmeter of claim 1, wherein the electrode central angle is greater than or equal to 30° and less than or equal to 60°.

4. The flowmeter of claim 1, wherein the field central angle is greater than or equal to 50° and less than or equal to 90°.

5. The flowmeter of claim 1, wherein a rotationally unsymmetric flow is generated for the test measurement by a disturbance disposed at the inlet side end plane and comprising at least one disturbance source.

6. The flowmeter of claim 5, wherein the disturbance is disposed with a distance 0-DN from the inlet side end plane.

7. The flowmeter of claim 1, wherein:
    10% of the cross-section of the measuring tube is covered by a diaphragm;
    the diaphragm has a chord that bounds the diaphragm toward the tube;

the diaphragm is configured to assume a first diaphragm orientation or a second diaphragm orientation;

in the case of the first diaphragm orientation, the chord is oriented perpendicular to the magnetic field, and in the case of the second diaphragm orientation, the chord is oriented in parallel with the magnetic field;

an elbow of 90° is disposed upstream of the measuring tube, wherein the elbow is configured to assume a first elbow orientation or a second elbow orientation; and the first elbow orientation is distinguished by an upstream tube axis extending perpendicular to the magnetic field and to the longitudinal direction of the measuring tube, and the second elbow orientation is distinguished by the upstream tube axis extending parallel with the magnetic field and perpendicular to the longitudinal direction of the measuring tube.

8. The flowmeter of claim 1, wherein an insensitivity to a rotationally unsymmetric flow profile is provided at a Reynolds number of the medium in the measuring tube greater than or equal to 100,000.

9. The flowmeter of claim 1, wherein an insensitivity to a rotationally unsymmetric flow profile is provided at a Reynolds number of the medium in the measuring tube greater than or equal to 10,000.

10. The flowmeter of claim 1, wherein each of the at least two measuring electrode components includes a square, rectangular or oval media-contacting surface.

11. The flowmeter of claim 10, wherein the media-contacting surface is rounded at its ends or transitions into a circular shaped cross-section.

12. The flowmeter of claim 1, wherein:
each of the at least two measuring electrode components includes at least one electrode shaft;
each of the at least two measuring electrode components includes an electrode sheet material; and
the at least one electrode shaft is configured to contact the electrode sheet material electrically and to connect with the inner surface of the measuring tube by shape-interlocking.

13. The flowmeter of claim 12, wherein the at least one electrode shaft is stylus shaped, pointed or mushroom shaped.

14. The flowmeter of claim 12, wherein the at least one electrode shaft and the electrode sheet material are embodied as one piece or connected by material bonding.

15. The flowmeter of claim 1, wherein the at least two measuring electrode components are arranged axisymmetrically to the vertical longitudinal plane.

* * * * *